(No Model.)
C. S. CORNING.
APPARATUS FOR MASHING GRAIN IN DISTILLERIES.
No. 325,323. Patented Sept. 1, 1885.
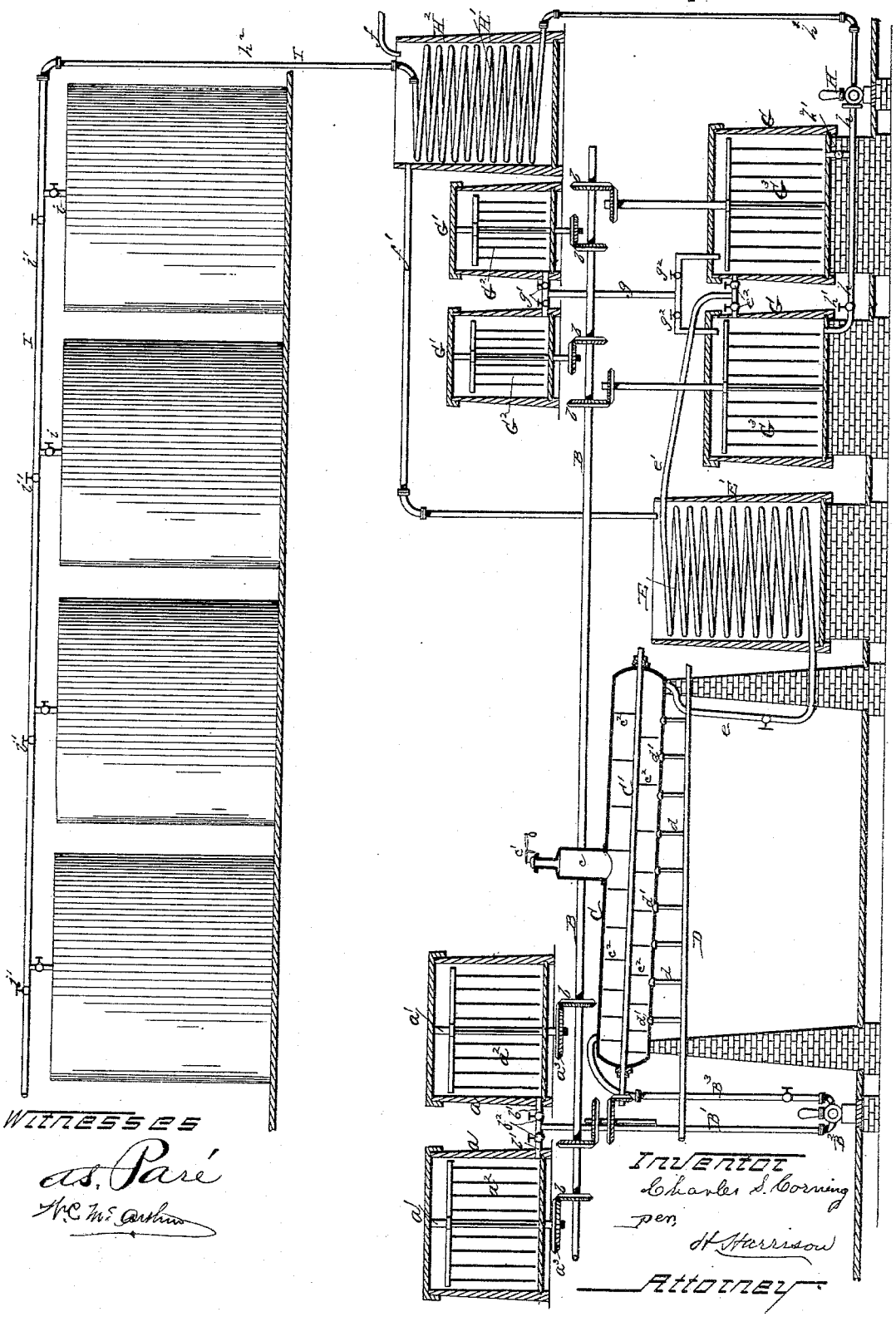

United States Patent Office.

CHARLES S. CORNING, OF PEORIA, ILLINOIS.

APPARATUS FOR MASHING GRAIN IN DISTILLERIES.

SPECIFICATION forming part of Letters Patent No. 325,323, dated September 1, 1885.

Application filed January 20, 1885. (No model.)

*To all whom it may concern:*

Be it known that I, CHARLES S. CORNING, a citizen of the United States, residing at Peoria, in the county of Peoria and State of Illinois, have invented certain new and useful Improvements in Apparatus for Mashing Grain in Distilleries, of which the following is a specification, to wit:

This invention relates to an improvement in apparatus for mashing grain in distilleries; and it consists in the peculiar construction and operation of the same, substantially as will be hereinafter more fully described and claimed, whereby the mash is prepared for direct introduction to the fermenting-tubs without being exposed to the air or the aid of a vacuum, the process of manufacture is made continuous, and the starch nearly or quite entirely liquefied, yielding a large quantity of spirits with less time, labor, and steam than by the apparatus in common use.

In order to enable others skilled in the art to which my invention relates to avail themselves of its benefits, I will now proceed to describe its construction and operation, referring to the accompanying drawing, in which is shown a sectional diagram view of the apparatus I shall now describe.

The main idea in this apparatus is to obtain a continuous passage of material through the scalding-vessel, to subject it to a high temperature as soon as introduced into the scalder, and thus economize time and steam, while dispensing with the usual vacuum-pumps, under-back, and their connections. This may of course be accomplished in various ways by applying the principles herein stated; but I prefer to use the apparatus shown, in which—

$a$ $a$ represent two open mixing-tubs, in which corn or other material to be operated upon is mixed with water, slop, or other liquid, the grain and water being mixed in a heated state, or heat applied to the mixture, and each tub is provided with a central shaft, $a'$, carrying the revolving mixer or stirrer $a^2$, by which the contents are thoroughly mixed before being transferred to the scalding cylinder. This shaft is provided with a bevel-gear, $a^3$, which receives motion from a similar gear, $b$, upon the main driving-shaft B. The two mixing-tubs are connected by short sections of pipe $b'$, each having a valve or stop-cock, $b^2$, with the pipe B', which leads to a pump, $B^2$, of any desired or suitable construction, which receives the material from either of the mixing-tubs and forces it through a pipe, $B^3$, into the scalder C. This vessel is preferably a cylinder of suitable length and sufficient strength to withstand the steam-pressure to which it is subjected, and is provided with a steam-dome, $c$, and blow-off valve $c'$, by which any extra pressure over and above that required for effective work is automatically relieved and the pressure kept at all times as desired.

A steam-pipe, D, connected at any suitable steam-generator, is led along beneath or beside the scalder C, and is connected thereto at intervals by a series of short connecting-pipes, $d$, each provided with a check-valve, $d'$, opening outward toward the scalder, and through which the steam is admitted to the cylinder. While I desire to connect these steam-supply pipes with the scalding-vessel at any point found suitable, I prefer to do so along the under side, as herein shown, in order that the steam may pass through the material under operation and more effectively act upon it, as well as keeping it constantly agitated. This cylinder is provided with a gage, try-cocks, thermometer, and other auxiliary devices, such as are usually required upon apparatus of a similar nature, and which are too well known to need a description or illustration in this connection. A shaft, C', runs longitudinally through the scalder, on which are a series of arms, $c^2$, which, as the shaft is revolved, stir up the material and allow it to become thoroughly scalded. In some cases this scalding-cylinder C, will be placed horizontal; but I prefer to place it upon a slight incline, as represented in the drawing, in order that the mash introduced at the upper end by the force-pump may pass slowly toward the lower end, where it is expelled, and the time required in its passage will be regulated according to the time taken to thoroughly scald the material at any desired temperature, and thus enable the material to be properly treated at this stage of the manufacture while being continuously forced through the scalder.

The lower or rear end of the scalder is by a pipe, $e$, connected with a worm or other cooling device, E, which is inclosed in a water-tank, E', through which a continuous flow of water is passed to cool the mash to the proper temperature for the introduction of the small grain. The discharge end of the worm E is connected to a pipe, e', which connects with two converting-tubs, G, and is provided with valves $e^2 e^2$, by which the mash is directed into either of these tubs, as desired. The converter-tubs are closed at their upper ends to prevent the contact of the outer air with the material under operation. Above these tubs G are located one or more small grain-tubs, G', in which the small grain or malt is prepared, and which are connected by a pipe, g, with the two converter-tubs, this pipe being provided with suitable valves, $g' g^2$, by which the contents of either one of the small tubs are directed into either of the converters at pleasure. The small grain-tubs G' are provided with revolving mixing or agitating arms $G^2$, and the converting-tubs G with similar agitators, $G^3$, all of which are geared to the main driving-shaft, as before described for the main mixing-tubs.

Both the converting-tubs G are connected by a pipe, h, with a pump, H, and valves $h' h'$ are provided to regulate the flow from either tub at will. From the pump H, a pipe, $h^2$, leads to a cooling coil or worm, H', inclosed in a tank, $H^2$, and from thence the mash is passed through a pipe, I, having connections i with a series of fermenting tubs, and provided with valves i', by which it is directed into either of said tubs at will. A water-supply, f, is provided, and an overflow, f', runs from the tank $H^2$ to the tank E', so that not only is no water wasted, but the same is made to do double duty.

The operation is as follows: Cornmeal or other suitable material is mixed with water, slop, or other liquid, the latter being preferably hot to keep the grain from settling, and the whole thoroughly stirred by means of the revolving arms provided for the purpose. Steam having in the meantime been turned onto the scalder and a sufficiently-high temperature and pressure obtained, the valves are opened in the proper pipe-connections, and the pump draws the mixture from one of the tanks and forces it into the scalding-cylinder. It will be noticed that when the mixture enters this cylinder it is instantly subjected to a sufficiently-high temperature and pressure, and is in consequence thoroughly scalded and good results obtained. When sufficient material has accumulated in the scalder, the valves in the exit-pipe are opened, and it is allowed to escape in the same quantity as it is forced in, and there is thus a constant passage of material through the machine, facilitating the work, and saving time, labor, and steam. The mash is constantly agitated by the revolving beaters and its passage so timed as to be fully cooked before being ejected. The steam-pressure in the scalder is sufficient to force the scalded mash through the worm E into the proper converter, and is there mixed with the proper quantity of small grain or malt, and is then drawn out by the pump H and forced through the cooling-worm H' into a fermenting-tub.

It will be observed that for mixing and converting I have provided more than one tub, thus enabling one to be used while another is being prepared, and a continuous operation of the scalder is obtained. The small-grain tubs are also here shown in a pair; but one is all that is absolutely needed, as there is always time for cleaning and mixing before a second charge of small grain is needed. I design in practice to provide the gears upon the driving-shaft with shifting-levers, by which any portion of the machinery may be started or stopped at will; but this is an obvious advantage in the operation which I have considered too well known to need illustration.

In a separate application of even date with this I have described and claimed the process.

Having thus fully described my invention, what I claim as new, and desire to secure by Letters Patent, is—

1. In an apparatus for mashing grain, &c., the combination of an open vessel for mixing the grain, water, and slop, a closed scalding-vessel connected to said open vessel, with means to force material from said mixer into the scalder, a converter connected to the scalder by cooling-pipes, and the said converter being connected to fermenting-tubs, substantially as shown and described.

2. In an apparatus for mashing grain for distilleries, a pair of mixing-tubs having a single outlet-pipe provided with valves for controlling the flow from one or the other, a pump connected therewith, a closed scalding-vessel, with one end of which the pump is connected, and a cooling device connected to the other end of the scalder, in combination with a pair of converting-tubs connected to the cooler by a pipe having valves to control the flow to either tub, a small-grain tub similarly connected to these tubs, a pump connected to the converting-tubs and also to a cooling device interposed between the pump and the fermenting-tubs, whereby the mash is prepared and converted in one tub of each pair while the other is in use, and a continuous flow of material through the apparatus is obtained, substantially as and for the purpose set forth.

In testimony whereof I affix my signature in presence of two witnesses.

CHARLES S. CORNING.

Witnesses:
GEO. J. GIBSON,
W. C. McARTHUR.